UNITED STATES PATENT OFFICE 2,640,772

PLANT FERTILIZER

John Morris Arthur, Yonkers, N. Y., assignor to Boyce Thompson Institute for Plant Research, Inc., a corporation of New York No Drawing. Application January 18, 1950, Serial No. 139,324

4 Claims. (Cl. 71—18)

This invention relates to the fertilization of soil for plant growth and has for its object the provision of a method for growing plants, an improved composition for fertilizing soils, and an improved composition of soil and plant fertilizer. This invention is based on my discovery of a means of effecting a slow release of the nitrogen of certain waste organic materials and provides a composition in the form of a mixture of an organic nitrogen-bearing material of the group consisting of wool, hair and feathers, and a smaller amount of phosphorous-bearing inorganic material, such as an inorganic phosphate. The composition constituents in admixture with each other and the soil produce a slowly available plant food which is very effective in the support and development of plants.

Either the soil should include at least partially undigested carbohydrate of vegetable origin, such as plant humus naturally present in the soil, or the composition should include an added carbohydrate-bearing material, preferably of plant origin, such as agave, straw, chaff, and the like, admixed with the soil or the composition. The phosphorous-bearing material may be in any suitable form as in a phosphorous-rich soil, a natural rock phosphate finely ground, or an inorganic phosphate, such as super-phosphate of the type widely used in commercial fertilizers. In one of its practical and advantageous embodiments, any suitable form of the common inorganic fertilizer mixtures, say (formula 5–10–5), may be used in the composition to support both the rapidly digesting carbohydrate material and the growth of the young plants.

The compositions of my invention in admixture with the soil, for example, loam, clay or sand, release plant food slowly under conditions sufficient to maintain and develop comparatively large plants, such as tomatoes, for a period of several months, up to and including the development of ripe fruit, even when grown in four-inch flower pots. The organic nitrogen-bearing material and the carbohydrate are preferably ground and the composition comprises from $\frac{1}{16}$ to $\frac{1}{2}$ part by volume (from 14 to 73 grams) of organic nitrogen-bearing material and from $\frac{1}{16}$ to $\frac{1}{2}$ part by volume (42 to 212 grams) of added carbohydrate material with the remainder substantially all soil. The composition proportions must be based upon the character of the soil and the amounts of phosphates, nitrates, and carbohydrates naturally therein. In general, the light sandy soils require less inorganic nitrate which releases nitrogen quickly and inorganic phosphate in order to avoid burning and injury to the young plants when they are first set into pots containing the composition. In the case of heavy loam soils, greater amounts of inorganic nitrates and inorganic phosphates may be used without burning or injuring the young plants. When only an organic nitrogen-bearing material, such as wool, is added to a soil containing a sufficient amount of available phosphorus and undigested carbohydrates, the wool will furnish all the available nitrogen to the young plant which is needed to support maximum growth and development.

The composition appears to undergo a sort of chain reaction in the soil which may be explained as follows: The nitrogenous organic material is very slowly digested by soil bacteria making amino acids, ammonia and other nitrogenous decomposition products available. The plant carbohydrate material digests at a more rapid rate using up the nitrogen, especially the nitrate nitrogen, which is initially available. For this reason a small amount of inorganic, nitrogen-bearing material, preferably a nitrate, is added as a "starter" to insure a sufficient supply of available nitrogen for the young plant which otherwise would soon shown signs of nitrogen hunger. The carbohydrate material, as it is digested, serves as an accumulator for nitrates and slowly releases nitrogen again from the organic nitrogen-bearing material after digestion has proceeded. When water-soluble nitrates are naturally present in the soil or when such nitrates are added in the composition, they act as starters for, and promote the digestion of, the carbohydrates which eventually increase the organic matter in the soil and thus accumulate nitrogen. Only a small amount of the carbohydrate material may be used in proportion to the organic nitrogen-bearing material, since otherwise all of the available nitrogen would be used and both the chemical and the physical characters of the resulting soil would be undesirable for plant growth. The decomposition products of the organic nitrogen-bearing material, especially in compositions comprising wool, have been found to increase the fixation of atmospheric nitrogen in the soil. The addition of both carbohydrate and inorganic phosphates greatly aid this process. It has been found that excessive additions of nitrate nitrogen to the composition greatly retard the digestion and use by plants of the other materials of the composition and also retard the action of bacteria fixing nitrogen from the air. My preferred composition comprising wool may therefore not only deliver available nitrogen to the growing plant because of the slow digestion of the wool but may also actually fix nitrogen from the air, especially when the acidity of the soil is near the neutral point.

In a series of tests, using waste wool residues from a rug and carpet manufacturing process containing approximately 7.7% total nitrogen and agave fiber residues as the carbohydrate material, it was found that a composition containing 75% soil, about 22% (32 grams) wool residue, and about 3% (13.2 grams) agave residue, by volume, plus an addition of a a starter consisting of 5.6 grams each of superphosphate and inorganic fertilizer (formula 5–10–5), added to each liter of volume of the combined materials formed an excellent medium for growing young tomato plants to the stage of ripe fruit production in small four-inch flower pots. Such an amount of fertilizer (5–10–5 formula) is equivalent to about 0.3 gram of nitrogen. Twice the above amounts of the inorganic fertilizers could be used without producing marked injury or burning of the young plants, but such amounts produced a slower initial development of the young plants. Neither the use of the agave residue alone nor when combined with the above amounts of inorganic fertilizer materials produced comparable lasting results on tomato plants. The addition of agave without the wool residue greatly inhibited the growth and development of the plants as compared with those in soil alone with the above amounts of fertilizer added. It was also found that young tomato plants would not withstand equivalent amounts of nitrogen added to the soil either as sodium nitrate, or as wool which had been digested with 30% hydrochloric acid, evaporated to dryness, and neutralized with lime. Such treatment of soils with highly available nitrogen will not only kill the young plant but, being water soluble, may be easily removed by leaching with water, leaving a shortage of nitrogen in the soil.

My invention makes available as an effective plant food such waste materials as wool, animal hair or feathers, and plant residues derived from the milling of farm crops, such as straw, chaff, agave, a plant residue left after the fibers have been milled out for twine production, peat moss, cotton linters, and wood fiber. Mixtures of such materials where incorporated into soils were found to be more lasting in effect and less injurious to young plants than either farm manures or inorganic fertilizers of comparable nitrogen content, the latter giving only a temporary stimulation to plant growth.

I claim:

1. A composition of matter for the growing of plants which comprises as a major active constituent from $\frac{1}{10}$ to $\frac{1}{2}$ part by volume of an organic nitrogen-bearing material of the group consisting of wool, hair and feather in admixture with not more than 3% by volume of undigested carbohydrate material of plant origin a relatively small proportion of an inorganic nitrate which releases nitrogen rapidly to serve as a starter for a young plant, and an inorganic phosphate, said composition being so balanced between carbohydrate and organic nitrogen content that it furnishes during its decomposition a steady supply of nitrogen for growing plants in small containers without injury due to excess soluble nitrogen and at the same time increases the fixation of atmospheric nitrogen by micro-organisms when mixed with neutral soil.

2. A composition of matter for the growing of plants which comprises as a major active constituent an organic nitrogen-bearing material of the group consisting of wool, hair and feathers in admixture with not more than 3% by volume of an undigested carbohydrate material of plant origin, a relatively small proportion of a nitrate of the group consisting of sodium nitrate, potassium nitrate, and ammonium nitrate, which serves as a starter for a young plant until the carbohydrate undergoes digestion and a phosphorous-bearing material.

3. The method of growing plants in pots which comprises providing in the pot a mixture including soil, from $\frac{1}{10}$ to $\frac{1}{2}$ part by volume of an organic nitrogen-bearing material of the group consisting of wool, hair and feathers, not more than 3% by volume of an undigested carbohydrate of plant origin, a relatively small part of a material that releases nitrogen rapidly, and a phosphorous-bearing material, said mixture being so balanced between carbohydrate and organic nitrogen content that it furnishes during its decomposition a steady supply of nitrogen for growing plants in small containers without injury due to excess soluble nitrogen and at the same time increases the fixation of atmospheric nitrogen by micro-organisms when mixed with neutral soil.

4. The method of growing plants in pots comprising surrounding the roots of the plants with a composted mixture of about 75% of soil, about 22% wool residue, about 3% of undigested carbohydrate, by volume, and not more than 0.3 gram per liter of nitrogen in the form of nitrate which releases nitrogen rapidly to feed the young plant prior to the slow digestion of the wool.

JOHN MORRIS ARTHUR.

References Cited in the file of this patent

UNITED STATES PATENTS

| Number | Name | Date |
| --- | --- | --- |
| 62,760 | Leinau | Mar. 12, 1867 |
| 155,341 | Sparhawk et al. | Sept. 22, 1874 |
| 514,042 | Seldner | Feb. 6, 1894 |
| 1,320,701 | Manns | Nov. 4, 1919 |
| 1,424,829 | Kleb | Aug. 8, 1922 |

FOREIGN PATENTS

| Number | Country | Date |
| --- | --- | --- |
| 513 | Great Britain | Feb. 12, 1873 |

OTHER REFERENCES

Chemical Abstracts, vol. 38 (1944), col. 6470 (abstract of article by Manns).

Bruttini: Uses of Waste Materials, P. S. King & Son, Ltd., London (1923), pages 252–254.